(12) United States Patent
Maugars

(10) Patent No.: US 6,760,858 B1
(45) Date of Patent: Jul. 6, 2004

(54) METHOD ENABLING AN EXCHANGE OF DATA BETWEEN A SMART CARD AND AN APPARATUS

(75) Inventor: Philippe Maugars, Ranes (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 531 days.

(21) Appl. No.: 09/649,848

(22) Filed: Aug. 29, 2000

(30) Foreign Application Priority Data

Aug. 31, 1999 (FR) .............................. 99 10953

(51) Int. Cl.$^7$ .............................. G06F 1/04; H02H 3/05; H04B 1/38
(52) U.S. Cl. ...................... 713/600; 713/322; 713/400; 714/22; 455/572
(58) Field of Search ................................ 713/500, 600, 713/300, 400; 714/22; 455/572, 502, 574

(56) References Cited

U.S. PATENT DOCUMENTS

| | | | | |
|---|---|---|---|---|
| 4,584,651 A | * | 4/1986 | Carey, Jr. et al. | 702/176 |
| 4,653,054 A | * | 3/1987 | Liu et al. | 714/814 |
| 4,876,683 A | * | 10/1989 | Suzuki | 370/501 |
| 5,077,734 A | * | 12/1991 | Ohtsuka | 370/509 |
| 5,493,700 A | * | 2/1996 | Hietala et al. | 455/75 |
| 5,717,936 A | * | 2/1998 | Uskali | 713/340 |
| 6,138,029 A | * | 10/2000 | Digabel | 455/502 |
| 6,397,088 B1 | * | 5/2002 | Roo | 455/572 |

FOREIGN PATENT DOCUMENTS

JP 407056885 A * 3/1995

OTHER PUBLICATIONS

Mark T. Smith, "Smart Cards: Integrating for Portable Complexity", Aug. 1998, pp 110–115.*
International Standard ISO/IEC 7816–3:1997.

* cited by examiner

Primary Examiner—Thomas Lee
Assistant Examiner—Chun Cao
(74) Attorney, Agent, or Firm—Kevin Simons

(57) ABSTRACT

Disclosed is a method that enables a smart card to exchange data with an apparatus, which is intended to supply the smart card with a permanent clock signal in a permanent mode of operation. The method according to the invention includes the steps of detecting, in the course of the permanent mode of operation, of an impending disappearance of the permanent clock signal, wherein the detecting step includes a comparison of the value of the amplitude of the permanent clock signal with a predetermined value; and substituting an auxiliary clock signal for the permanent clock signal. The invention enables the smart card to receive, after the disappearance of the permanent clock signal, a number of clock pulses which suffices for completing pending read/write operations.

8 Claims, 2 Drawing Sheets

METHOD ENABLING AN EXCHANGE OF DATA BETWEEN A SMART CARD AND AN APPARATUS

BACKGROUND OF THE INVENTION

The present invention relates to a method enabling a smart card to exchange data with an apparatus which includes an oscillator which is referred to as a permanent oscillator and is intended to supply the smart card with a clock signal, referred to as a permanent clock signal, in a permanent mode of operation.

A smart card includes an integrated circuit which is disposed on its surface and is provided with terminals for electrically contacting terminals of a connector which is accommodated in the apparatus which is usually an apparatus intended to receive and/or transmit data, such as a portable radio telephone, or a computer connected to a network, or a television signal decoder. The integrated circuit generally contains data necessary for the operation of the apparatus, for example a code enabling identification of the user having inserted the smart card into the apparatus, and the functions that the apparatus is allowed to offer to the relevant user.

The interactions between the apparatus and the smart card are described in a standard ISO/IEC 7816-3:1997.

A so-called activation phase of the smart card takes place in two steps: in a first mode of operation, referred to as a transitory mode of operation, the system formed by the combination of the smart card and the apparatus is not yet operational. The apparatus must first detect the presence of the smart card and then set the integrated circuit disposed on its surface to its nominal operating conditions, that is to say inter alia to provide it with a power supply voltage or to initialize data paths so that the integrated circuit can communicate with the apparatus. In a second mode of operation, referred to as the permanent mode of operation, the integrated circuit is supplied with a voltage and receives a permanent clock signal of a frequency which is called the operating frequency, and the data paths are ready to transport information between the integrated circuit and the apparatus. In the course of the transitory mode of operation the integrated circuit must receive a transitory clock signal whose frequency may differ from the operating frequency. Use is preferably made of a signal having a so-called transitory frequency which is lower than the operating frequency, thus enabling a reduction of the energy consumption of the integrated circuit in the transitory mode. Such a choice is particularly advantageous in the case of applications where the energy source used to supply the integrated circuit with its supply voltage is formed by a battery as is usually the case for a portable apparatus. Thus, at the end of the transitory mode of operation, the system has to switch over the signal applied as the clock signal to the integrated circuit provided on the surface of the smart card. Such switching over is performed by a switching device which, in response to a relevant command, replaces the transitory clock signal, constituting the clock signal of the integrated circuit in the course of the transitory mode of operation, by the permanent clock signal which is intended to constitute the clock signal of the integrated circuit in the permanent mode of operation.

The standard ISO/IEC 7816-3:1997 concisely describes a deactivation sequence for the smart card. Such deactivation takes place upon conclusion of a data exchange between the apparatus and the integrated circuit provided on the surface of the smart card, i.e. after the permanent mode has reached an end. Deactivation of the smart card must also take place when the power supply for the apparatus is untimely interrupted before the end of the permanent mode of operation, either by the user himself or by accident.

The deactivation sequence described in the standard ISO/IEC 7816-3:1997 specifies, without more detail, that the clock signal applied to the integrated circuit by the apparatus must be placed on hold in a low state which is formed by a logic level 0. However, if the interruption of the power supply for the apparatus is untimely, it may occur that the exchange of data between the apparatus and the integrated circuit has not yet been completed when the above-described deactivation takes place. This means that the integrated circuit still requires some clock pulses, for example in order to complete read/write operations taking place in a non-volatile memory included in the integrated circuit.

A pure and simple disappearance of the clock signal, such as described in the standard ISO/IEC 7816-3: 1997 thus involves the risk of inducing a loss of information, leading to incorrect information stored in the integrated circuit. This is not acceptable, particularly when taking into account the fact that the information stored in the integrated circuit of a smart card generally serves to protect and/or invoice financial transactions or communications.

SUMMARY OF THE INVENTION

It is an object of the present invention to remedy the described drawbacks by proposing a deactivation method enabling the integrated circuit disposed on the surface of the smart card to complete all read/write operations taking place at the instant of occurrence of an interruption of the power supply for the apparatus.

A method of the kind set forth in the opening paragraph according to the invention is characterized in that it includes the following steps:

detection, in the course of the permanent mode of operation, of an impending disappearance of the permanent clock signal before such a disappearance effectively takes place, substitution of an auxiliary clock signal for the permanent clock signal.

According to this method, the permanent clock signal is replaced, before its effective disappearance, by an auxiliary clock signal. The integrated circuit disposed on the surface of the smart card thus receives, after the disappearance of the permanent clock signal, a number of clock pulses which suffices to complete all read/write operations taking place.

According to an alternative version of the invention, the auxiliary clock signal is formed by the transitory clock signal, so that it is not necessary to take recourse to a supplementary oscillator.

In a further version of the invention, the described method includes, inserted before the step for substituting the auxiliary clock signal for the permanent clock signal, a step for synchronizing these signals.

Such synchronization enables the prevention of untimely arrival of an active clock edge at the integrated circuit provided on the surface of the smart card. Such an untimely edge would occur if an active edge of the transitory clock signal were to appear before an active edge of the permanent clock signal, after the substitution of the transitory clock signal for the permanent clock signal has taken place but so early that said active front of the transitory clock signal cannot be taken into account by the integrated circuit, notably because of the existence of excessively long critical paths within said integrated circuit.

A further version of the described method according to the invention is characterized in that said detection consists of a comparison of the value of a supply voltage for the apparatus with a predetermined value.

Another version of the described method according to the invention is characterized in that the detection consists of a comparison of the value of the amplitude of the permanent clock signal with a predetermined value.

The invention also relates to an apparatus for carrying out said method, which apparatus includes:
- a connector which is to be electrically connected to an integrated circuit present on the surface of said smart card and has at least one terminal which is referred to as a clock terminal and is intended to apply a clock signal to said integrated circuit,
- a microcontroller which is intended to exchange data with said integrated circuit,
- an oscillator which is referred to as a permanent oscillator and is intended to generate a permanent clock signal, and
- a switching device which is intended to direct the permanent clock signal to the clock terminal in a permanent mode of operation, which apparatus is characterized in that it also includes:
- detection means for detecting an impending disappearance of the permanent clock signal, and
- control means which enable, in the course of the permanent mode of operation, an auxiliary clock signal to be directed to the clock terminal upon detection of an impending disappearance of the permanent clock signal.

In such an apparatus the auxiliary clock signal is directed to the clock terminal of the connector as soon as an impending disappearance of the permanent clock signal is detected.

An attractive embodiment of the apparatus according to the invention also includes an interface module via which the smart card is intended to exchange data with the microcontroller, said interface module including an oscillator which is referred to as a transitory oscillator and is intended to supply the clock terminal with a transitory clock signal in a transitory mode of operation, said transitory clock signal constituting the auxiliary clock signal.

Because the interface module is realized in integrated form, and hence is powered by a voltage which is much lower than the voltage required by the apparatus for generating the permanent clock signal, the transitory clock signal will persist much longer than the permanent clock signal after the interruption of the power supply of the apparatus. This delay is sufficient to supply the integrated circuit with a number of clock pulses which suffices for completing all pending read/write operations.

BRIEF DESCRIPTION OF THE DRAWINGS

These and other aspects of the invention are apparent from and will be elucidated, by way of non-limitative example, with reference to the accompanying drawings; therein.

DETAILED DESCRIPTION OF THE INVENTION

Figure 1:
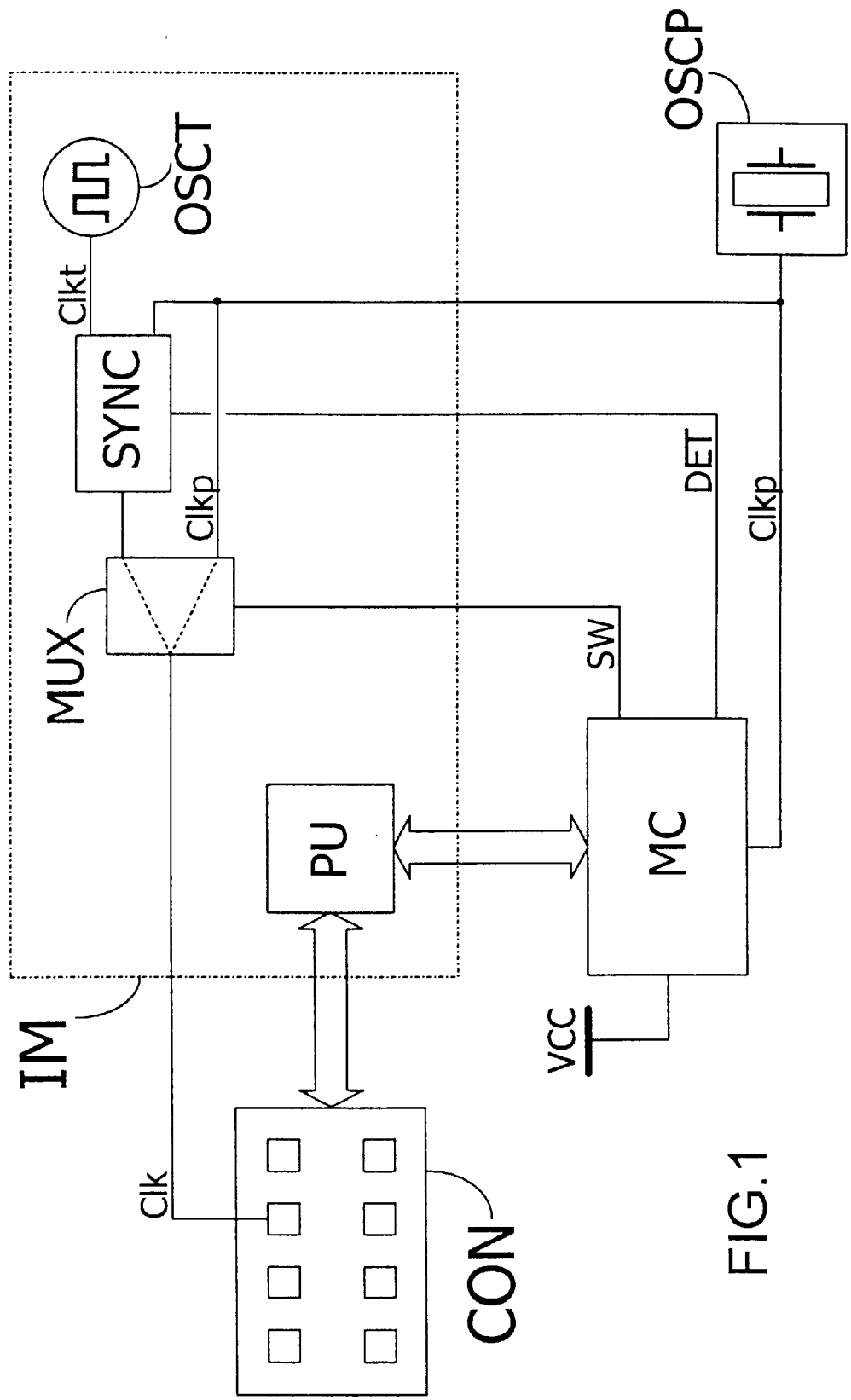
FIG. 1 shows a partial functional diagram of an apparatus for carrying out the method according to the invention.

FIG. 1 shows diagrammatically an apparatus for communication with a smart card, which apparatus includes:
- a connector CON which is intended to be electrically connected to an integrated circuit provided on the surface of said smart card and includes at least one terminal, referred to as a clock terminal, which is intended to supply said integrated circuit with a clock signal Clk,
- a microcontroller MC which is intended to exchange data with said integrated circuit,
- an interface module IM which is arranged between the connector CON and the microcontroller MC, includes an oscillator OSCT, referred to as a transitory oscillator, and is intended to generate a transitory clock signal Clkt, said interface module also including a processing unit PU which enables an exchange of data between the microcontroller MC and the integrated circuit,
- an oscillator OSCP, referred to as a permanent oscillator, which is intended to generate a permanent clock signal Clkp.

This apparatus further includes a switching device MUX which, in the present example, is integrated in the interface module IM and is intended to direct the transitory clock signal Clkt to the clock terminal in a so-called transitory mode of operation, and to direct the permanent clock signal Clkp thereto in a so-called permanent mode of operation.

This apparatus also includes:
- means for detecting an impending disappearance of the permanent clock signal Clkp, and
- control means which enable, in the course of the permanent mode of operation, an auxiliary clock signal to be directed to the clock terminal upon detection of an impending disappearance of the permanent clock signal Clkp.

In the embodiment described herein, the auxiliary clock signal is formed by the transitory clock signal Clkt. Thus, no third oscillator is required for generating the auxiliary clock signal.

In the embodiment illustrated by the present Figure, the means for detection and control are integrated in the microcontroller MC and hence are not visible in this Figure. They will be described in more detail hereinafter.

The apparatus described herein also includes means SYNC for synchronizing the transitory and permanent clock signals Clkt and Clkp, which means are to be activated upon detection of an impending disappearance of the permanent clock signal Clkp.

This apparatus enables the following procedure to be carried out so as to deactivate the smart card with which it exchanges data:

when an untimely interruption of the power supply of the apparatus occurs, the impending disappearance of the permanent clock signal Clkp, directed to the clock terminal of the connector CON thus far, is detected by the detection means included in the microcontroller MC. The detection means supply a signal DET which then assumes an active state. The active state of the detection signal DET activates the synchronization means SYNC included in the embodiment of the apparatus according to the invention which is illustrated by the present Figure. The active state of the detection signal DET at the same time activates the control means which generate a control signal SW. This control signal SW serves to control the switching device MUX which is formed, for example, by a multiplexer having two data inputs which receive the transitory clock signal and the permanent clock signal, Clkt and Clkp, respectively, and also a selection input which receives the control signal SW. The wiring of this multiplexer will be chosen to be such, for example that when the control signal SW has a logic level 0, the transitory clock signal Clkt is directed to the clock terminal by the multiplexer and, when the control signal SW has a logic level 1, the permanent clock signal Clkp is directed to the clock terminal by the multiplexer.

When the switching device MUX receives a relevant command, formed by a change of state of the control signal SW, and after the transitory and permanent clock signals Clkt and Clkp have been synchronized, i.e. when they have simultaneous active edges, said switching device MUX substitutes the transitory clock signal Clkt for the permanent clock signal Clkp by directing said transitory clock signal Clkt to the clock terminal.

The permanent clock signal Clkp can then disappear without the operations being carried out by the integrated circuit at the instant of interruption of the power supply for the apparatus being abruptly interrupted before their normal completion. Indeed, the interface module is realized in integrated form, and hence powered by a voltage which is much lower than the voltage VCC necessary for the permanent oscillator OSCP, generally being a quartz oscillator, for generating the permanent clock signal Clkp. The transitory clock signal Clkt, therefore, will persist longer than the permanent clock signal Clkp after the interruption of the power supply for the apparatus. This delay suffices to provide the integrated circuit on the surface of the smart card with a sufficient number of clock pulses so as to ensure that the read/write operations in the process of being carried out are completed.

Figure 2:
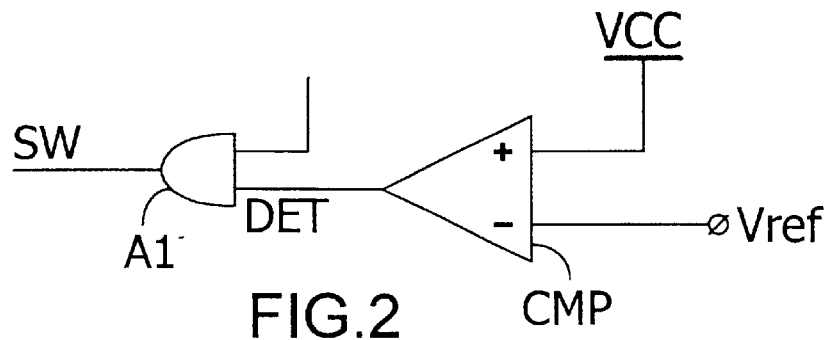
FIG. 2 shows an electrical diagram of a detection system provided in a particular embodiment of an apparatus according to invention.

FIG. 2 is an electrical diagram representing the detection and control means included in a specific embodiment of an apparatus according to the invention. The detection means in this embodiment include a comparator CMP which compares the value of the supply voltage VCC for the apparatus with a predetermined value Vref, and an output of which supplies an output signal which constitutes the detection signal DET. For example, a value equal to 70% of the nominal value of the supply voltage VCC can be chosen for Vref. As long as the real value of the supply voltage VCC is higher than the predetermined value Vref, the detection signal DET has a logic level 1 and does not affect the control means, which are in this case formed by a logic AND-gate A1, an input of which receives the detection signal DET and an output of which supplies the control signal SW. When the real value of the supply voltage VCC drops below the predetermined value Vref, the detection signal DET assumes an active state, being the logic level 0 in this case, which activates the control means by imposing a logic level 0 at the output of the logic AND-gate A1, thus setting the control signal SW to the logic level 0. At least one input of the logic AND-gate A1 receives another signal which determines which of the transitory and permanent clock signals Clkt and Clkp must be directed to the clock terminal during the transitory and permanent modes of operation.

The impending disappearance of the permanent clock signal, being an inevitable consequence of the disappearance of the supply voltage VCC as identified by the comparator CMP, is thus detected by the detection means and causes the activation of the control means and the substitution of the transitory clock signal Clkt for the permanent clock signal Clkp.

Figure 3:
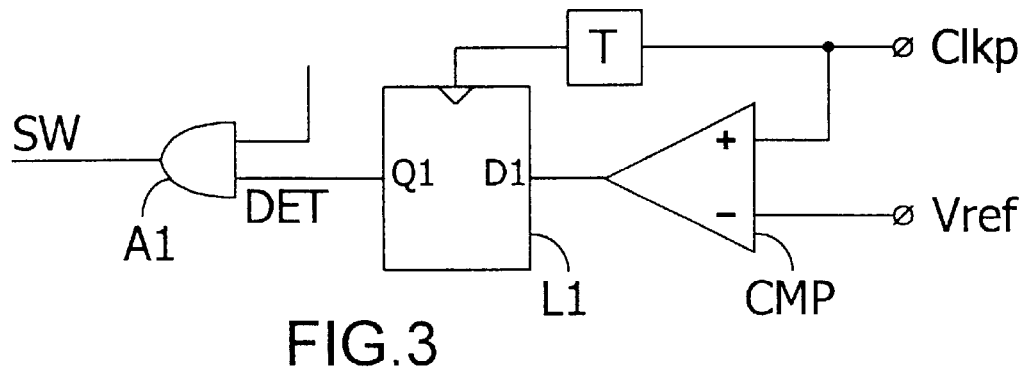
FIG. 3 shows an electrical diagram of a detection system provided in a further particular embodiment of an apparatus according to the invention.

FIG. 3 is an electrical diagram representing the detection and control means included in another specific embodiment of an apparatus according to the invention. The detection means in this embodiment include a comparator CMP which compares the instantaneous value of the permanent clock signal Clkp with a predetermined value Vref. For example, a value equal to 70% of the nominal value of the amplitude of the permanent clock signal Clkp can be chosen for Vref. The detection means also include a storage flipflop L1, a data input D1 of which is connected to the output of the comparator CMP, a clock input of which is intended to receive, via a delay cell T, the permanent clock signal Clkp, and a data output Q1 of which supplies the detection signal DET. The storage flipflop L1 is useful because of the fact that a clock signal is formed by a train of pulses. In the present example the result of the comparison performed by the comparator CMP, therefore, is significant only if the state of the permanent clock signal Clkp is high, i.e. when it has the logic level 1. Thus, when said clock signal Clkp shows an ascending edge, i.e. when it changes from the logic level 0 to the logic level 1, its maximum instantaneous value is compared with that of the reference signal Vref. The result of this comparison is present on the data input D1 of the storage flipflop L1 when, at the end of a predetermined delay period which is introduced by the delay cell T, the ascending edge of the permanent clock signal Clkp appears at the clock input of the storage flipflop L1. The result of the comparison is then stored by the storage flipflop L1 whose data output Q1 delivers the detection signal DET.

As long as the amplitude of the permanent clock signal Clkp, that is to say its value when it has the logic level 1, is higher than the predetermined value Vref, the detection signal DET has the logic level 1 and does not affect the control means, which are in this case formed by a logic AND-gate A1 in conformity with the previously given description. When the value of the amplitude of the permanent clock signal Clkp drops below the predetermined value Vref, the detection signal DET assumes an active state, in this case being the logic level 0, which activates the control means because it imposes a logic level 0 on the output of the logic AND-gate A1 and hence sets the control signal SW to the logic level 0.

The impending disappearance of the permanent clock signal Clkp, identified by the comparator CMP, is thus detected by the detection means and causes the activation of the control means and the substitution of the transitory clock signal Clkt for the permanent clock signal Clkp.

Figure 4:
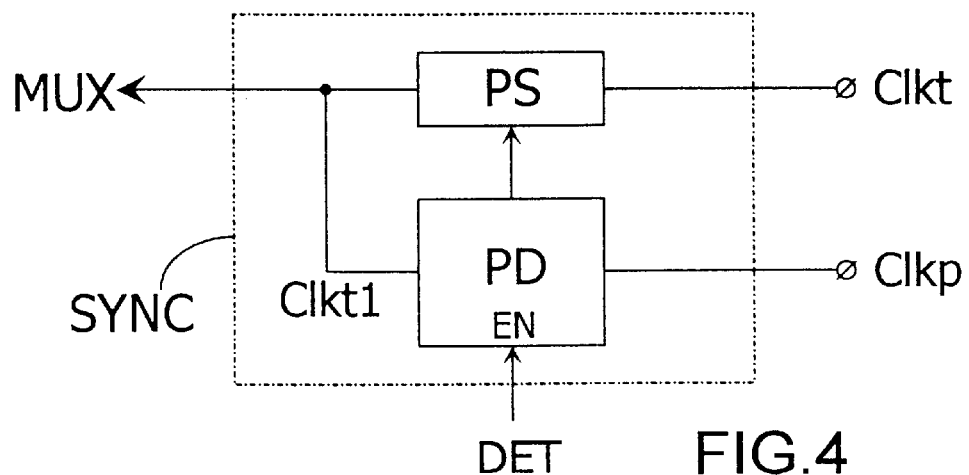
FIG. 4 shows a functional diagram of a synchronization device provided in an apparatus for carrying out a version of the above-mentioned method.

FIG. 4 is a functional diagram illustrating a possible embodiment of the synchronization means SYNC included in the apparatus described above. The synchronization means SYNC include a phase shifter PS which is intended to introduce a phase shift in the transitory clock signal Clkt. The output signal Clkt1 of the phase shifter PS which results from this operation is applied, in the form of the transitory clock signal, to the switching device MUX. The synchronization means SYNC also include a phase detector PD which is intended to measure the phase shift existing between the output signal Clkt1 of the phase shifter and the permanent clock signal Clkp. The phase detector PD is activated only when the detection signal DET presents an active state. It then determines, as a function of the value of the phase shift it has measured, the phase shift to be introduced in the transitory clock signal Clkt by the phase shifter PS in order to ensure that the output signal Clkt1 and the permanent clock signal Clkp present simultaneous active edges. In other embodiments of the synchronization means SYNC it may be elected to act directly on the transitory oscillator in order to modify the phase and/or the frequency of its output signal Clkt. For example, if the transitory oscillator is a voltage-controlled oscillator, the transitory clock signal Clkt could be synchronized with the permanent clock signal Clkp by means of a phase-locked loop.

What is claimed is:

1. A method enabling a smart card to exchange data with an apparatus which includes an oscillator and is intended to supply the smart card with a permanent clock signal, in a first mode of operation, wherein the method includes the steps of:

detecting, in the course of the first mode of operation, of an impending disappearance of a first clock signal before such a disappearance effectively takes place, wherein the detection includes a comparison of a value of the amplitude of the first clock signal with a predetermined value;

substituting an auxiliary clock signal for the permanent clock signal.

2. A method as claimed in claim 1, characterized in that, the apparatus including an interface module via which the apparatus is intended to exchange data with the smart card, said interface module including an oscillator which is referred to as a second oscillator and is intended to supply the smart card with a transitory clock signal in a second mode of operation, the auxiliary clock signal is formed by a second clock signal.

3. A method as claimed in claim 1, characterized in that it includes, inserted before the step for substituting the auxiliary clock signal for the permanent clock signal, a step for synchronizing these signals.

4. A method as claimed in claim 1, characterized in that said detection consists of a comparison of the a value of a supply voltage for the apparatus with a predetermined value.

5. An apparatus which is intended to communicate with a smart card, which apparatus includes:

a connector which is to be electrically connected to an integrated circuit present on the surface of said smart card and has at least one terminal which is referred to as a clock terminal and is intended to apply a clock signal to said integrated circuit;

a micro-controller which is intended to exchange data with said integrated circuit;

an oscillator intended to generate a clock signal;

a switching device which is intended to direct the clock signal to the clock terminal in a first mode of operation;

detection means for detecting an impending disappearance of the permanent clock signal, wherein the detection means include comparison means for comparing a value of the amplitude of the clock signal with a predetermined value, said comparison means being intended to deliver a signal controlling a control means; and control means which enable, in the course of the first mode of operation, an auxiliary clock signal to be directed to the clock terminal upon detection of an impending disappearance of the permanent clock signal.

6. An apparatus as claimed in claim 5, characterized in that it also includes an interface module via which the smart card is intended to exchange data with the micro-controller, said interface module including a second oscillator intended to supply the clock terminal with a second clock signal in a second mode of operation, said second clock signal constituting an auxiliary clock signal.

7. An apparatus as claimed in claim 5, characterized in that it also includes means for synchronizing the permanent clock signal and the auxiliary clock signal, which means are intended to be activated upon detection of an impending disappearance of the permanent clock signal.

8. An apparatus as claimed in claim 5, characterized in that the detection means include comparison means for comparing a value of the supply voltage for the apparatus with a predetermined value, said comparison means being intended to supply a signal controlling the control means.

* * * * *